United States Patent [19]
Fate

[11] Patent Number: 5,358,298
[45] Date of Patent: Oct. 25, 1994

[54] CAMPING ENCLOSURE

[76] Inventor: David G. Fate, 2700 E. Dublin Grandville, Ste. 290, Columbus, Ohio 43231

[21] Appl. No.: 47,961

[22] Filed: Apr. 15, 1993

[51] Int. Cl.$^5$ .................................................. B60P 3/345
[52] U.S. Cl. .................................... 276/26; 276/159; 276/161; 276/165; 276/167; 135/88
[58] Field of Search ................ 296/26, 164, 165, 159, 296/167, 161; 135/88

[56] References Cited

U.S. PATENT DOCUMENTS

| Re. 29,264 | 6/1977 | Woodward | 296/159 |
|---|---|---|---|
| 2,246,813 | 6/1941 | Preston | 296/26 |
| 2,353,820 | 7/1944 | Eddins | 296/26 |
| 2,815,762 | 12/1957 | Smith | 135/88 |
| 4,065,166 | 12/1977 | Shoemaker | 296/26 |
| 4,544,195 | 10/1985 | Gunn | 296/26 |
| 5,226,689 | 7/1993 | Roe et al. | 296/26 X |

FOREIGN PATENT DOCUMENTS

| 55228 | 6/1982 | European Pat. Off. | 135/88 |
|---|---|---|---|
| 3201413 | 9/1983 | Fed. Rep. of Germany | 296/26 |
| 2-248585 | 10/1990 | Japan | 135/88 |

OTHER PUBLICATIONS

Sears, Roebuck, and Co., Brochure entitled "Sears has everything for family camping", received Jan. 26, 1968, p. 7.

Primary Examiner—Dennis H. Pedder
Attorney, Agent, or Firm—Frank J. McGue; James F. Duffy

[57] ABSTRACT

A flexible enclosure structure which may be placed on a vehicle so that its bottom and two sides are anchored within the vehicle's interior. The top panel is fastened to the roof, preferably in a manner which results in a low air flow impedance. With the internal anchoring and the low air flow impedance to the structure along the outer surfaces of the vehicle, the vehicle may be driven on roadways for short errands while the structure is in place. When desired, the enclosure structure may be removed from the vehicle and folded, because of its flexibility, into a small, conveniently carried package. The structure includes windows to permit the entry of light and entry and exit flaps which may be closed during inclement weather. When the flaps are open, screening inhibits the entry of insects. When camping of more than a transient moment is anticipated, a tent enclosure may be coupled to the vehicle mounted enclosure.

16 Claims, 1 Drawing Sheet

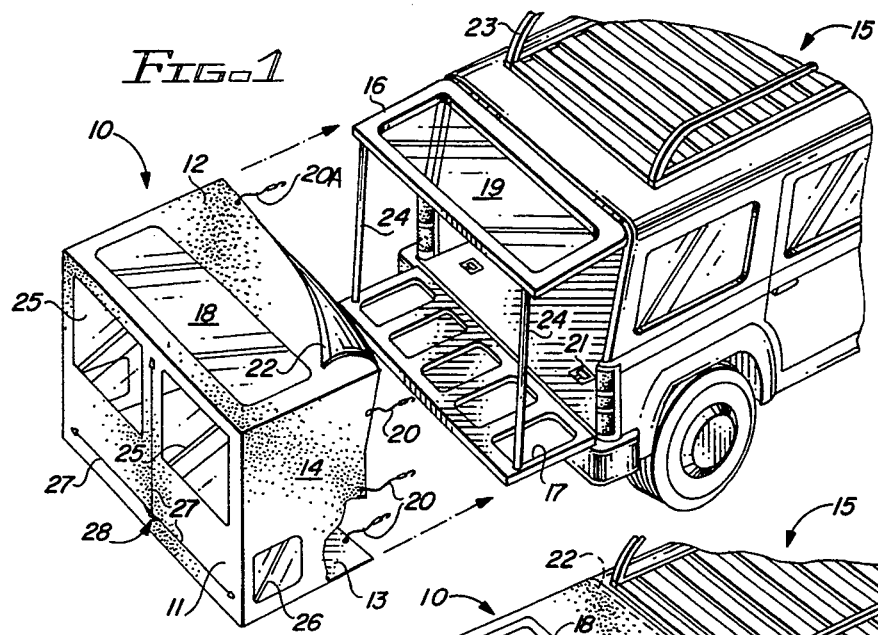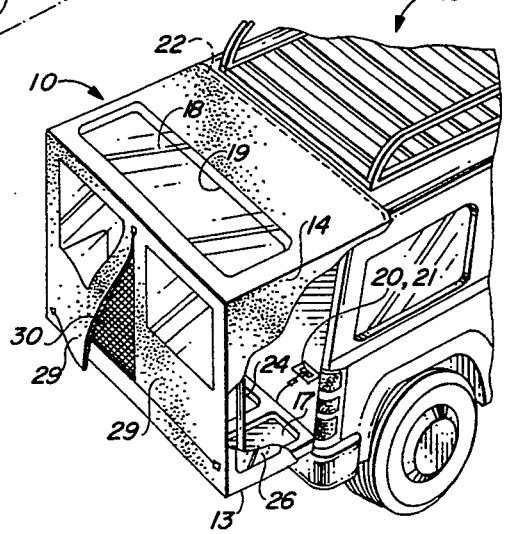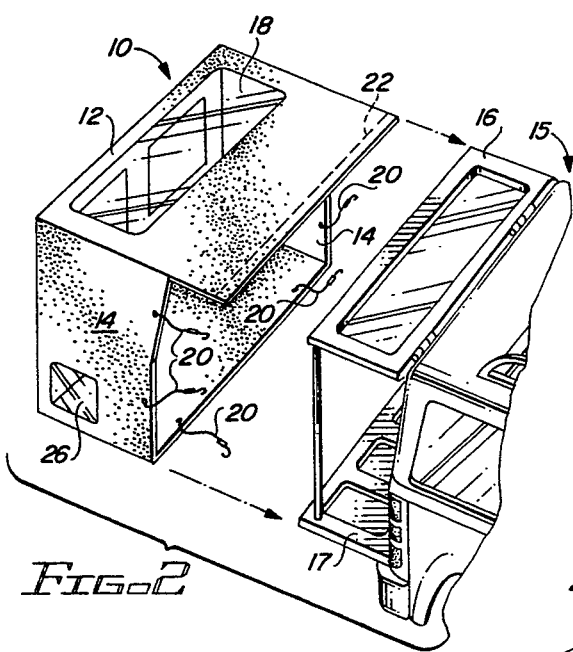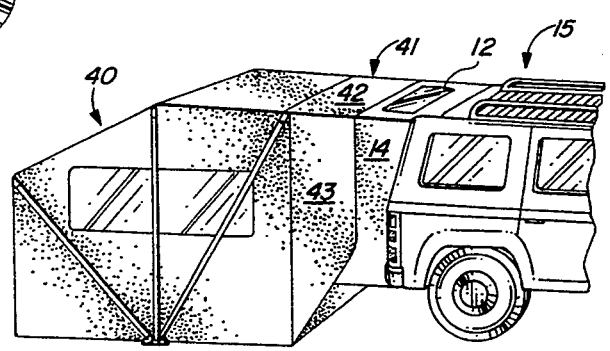

CAMPING ENCLOSURE

BACKGROUND

1. Technical Field of the Invention

The invention relates to the field of vehicular camping. That is camping in areas in which vehicles are used to transport a person or persons camping. In particular, the invention relates to an enclosure utilized at the rear of a vehicle having a lift window gate and a drop tailgate. The enclosure closing the vehicle and making it suitable for sleeping overnight.

2. Prior Background Art

Much innovation exists in camping accessories for attachment to motor vehicles. These run from the relative grandeur of hard body campers which are carried on the bed of a pickup truck and extend outward over the cab of such trucks. More prosaic are those plastic and canvas attachments which are intended for temporary erection and attachment to a motor vehicle. These must be removed before the vehicle can travel.

With the increased popularity of vans having doors at the rear, pickup trucks, and four wheel vehicles having lift window gates and drop tailgates, an urgency seems to express itself for a flexible, readily packed enclosure for enclosing the rear of such vehicles.

The present invention has as its object the enclosing of a vehicle having a lift window gate and a drop tailgate. It is an objective of the present invention that it may be fastened to the vehicle in a manner which will allow the vehicle to be driven with the enclosure in place.

SUMMARY DESCRIPTION OF THE INVENTION

The invention is summarized as a portable enclosure which comprises, a face panel peripherally bordered by a top panel, a bottom panel, and a pair of side panels, the combination forming a foldable, open, box-like structure. Included too is an automotive vehicle having a rear, lift window gate and a drop tailgate. There is a plurality of protuberances within the interior of the vehicle to which load securing straps are removably affixed. The plurality of load securing straps couple the foldable, box-like structure and the plurality of protuberances so as to draw the side panels inwardly toward the forward interior of the vehicle, the top panel forwardly and downwardly atop the lift window gate; and the bottom panel forwardly and upwardly against the drop tailgate.

The lift window gate and the drop tailgate further comprise means for placing the pair of side panels of the box-like structure in tension. This is done with means for urging and maintaining the lift window gate and the drop tailgate apart. This applies an upward directed force to the top panel of the box-like structure and a downward directed force to the bottom panel, the opposing forces placing the side panels in tension. Preferably, the means for urging and maintaining the window lift gate and the drop tailgate apart comprise a wedge pole coupled between the lift gate and the tailgate urging the gates apart.

In a preferred embodiment the top panel of the box-like structure includes a flexible window. The flexible window is juxtaposed with the window of the vehicle's lift window gate when the load securing straps couple the foldable, box-like structure to the protuberances within the vehicle. The face panel of the box-like structure includes a flexible window therein.

Preferably, the face panel of the box-like structure also includes a first entry and egress port for permitting entry to and exit from the vehicle through the port. The port includes closure means for inhibiting entry of persons and inclement weather through the port. The port is also screened to inhibit entry of insects into the enclosure.

In a presently preferred embodiment the enclosure further comprises a ground based antichamber removably coupled to the top and side panels of the box-like structure. The antichamber is a tent having a second entry and egress port juxtaposed to the first entry and egress port in the face panel of the box-like structure. When the antichamber is coupled to the top and side panels of the structure, the juxtaposition of the first and the second entry and egress ports permits a person egress from the vehicle and entry into the antichamber.

BRIEF DESCRIPTION OF THE DRAWINGS

FIG. 1 is an exploded perspective assembly view of the foldable, enclosure structure onto the rear of a motor vehicle viewed from the rear and side of the vehicle FIG. 2 is an exploded perspective assembly view of the foldable, enclosure structure onto the rear of a motor vehicle viewed from a point forward of the rear of said vehicle.

FIG. 3 is a perspective view illustrating the foldable, enclosure structure mounted on the rear of the vehicle.

FIG. 4 shows the vehicle of FIG. 3 backed into the entry of a tent which form an antichamber to the foldable enclosure structure.

DETAILS OF BEST MODE FOR CARRYING OUT THE INVENTION

For purposes of promoting an understanding of the principles of the invention, reference will now be made to the embodiments illustrated in the drawings and specific language will be used to describe same. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

FIG. 1 is an exploded assembly drawing showing in perspective a portion of a vehicle 15 having a lift window gate 16 and a drop tailgate 17. The invention 10 is a flexible, open, box-like structure having a face panel 11, a top panel 12, a bottom panel 13, and side panels 14. In the illustration of FIG. 1, the box-like structure 10 is intended to be moved forward toward vehicle 15 so that bottom panel 13 lies beneath truck tailgate 17 and top panel 12 covers lift window gate 16.

FIG. 1 is drawn from the perspective of a person standing somewhat to the rear and to the side of the vehicle 15. FIG. 2 presents the situation from a different perspective, i.e. a person slightly forward of the rear of the vehicle and at its side. FIG. 2 allows one to look into the structure 10 prior to its assembly on vehicle 15. FIGS. 1 and 2 may be referred to as the discussion continues.

Structure 10 is advanced so as to encompass lift gate 16 and tailgate 17. If a vehicle is equipped with a rooftop carrier 23, as illustrated in FIG. 1, the top panel 12 of structure may be drawn toward carrier 23 by use of elasticized loading straps 20A. Alternatively, for vehicles having carrier 23 or those which lack such carriers, a rubberized magnetic strip 22 is provided on the underside of top panel 12 to adhere the leading edge of top panel 12 to the roof of vehicle 15.

As the structure 10 is moved towards vehicle 15 and encompasses lift gate 16 and tailgate 17, the leading edge of sides 14 are drawn into the interior of vehicle 15 and maintained there by the use of elasticized load straps 20. Load straps 20 are provided with hooks at each end which will be fastened to load fasteners, for example load fastener 21 shown in the floor of vehicle 15.

In using elasticized load straps 20, use is made of existing features within vehicle 15 to which the straps 20 may be hooked. This may include the support members beneath passenger seats, mounting hardware for spare tires, or dedicated load fastening devices such as 21 shown in the floor of vehicle 15 in FIG. 1.

The enclosure structure 10 is shown in position for use on vehicle 15 in FIG. 3. Here the elasticized load straps 21 draw the sides 14 of enclosure structure 10 towards the forward end of the vehicle 15. As seen in FIG. 3, bottom panel 13 of structure 10 passes beneath tailgate 17 and is drawn upwards and in close contact with tailgate 17 by elasticized strap 20, which is fastened to load fastener 21.

With the elasticized load straps 20 drawing bottom panel 13 and side panels 14 forward into the interior of vehicle 15 there is little wind resistance imposed on the surfaces of the side and bottom panels as experienced in structures in which such similar panels are anchored at the outside of the vehicle. Top panel 12 is anchored either by elastic straps 20A to a carrier such as 23 and, carrier or no, has its leading edge in contact with the roof surface and maintained there by rubberized magnetic strip 20. Thus, there is little wind resistance applied to the top surface of the enclosure structure 10 which would draw the top panel away from its contact with vehicle 15.

Because of the manner in which the enclosure structure 10 is anchored within the vehicle interior and along the roof surface, a vehicle with enclosure structure 10 in place, as illustrated in FIG. 3, has been driven on State roads and highways at speeds in excess of forty miles per hour. The advantage of this is that a person on a camping trip utilizing enclosure structure 10 for overnight sleeping may run quick errands to the local store, and the like, for supplies. The invention does not advocate that enclosure structure 10 be maintained in position while traveling long distances on highways at highway speeds.

In the illustration of FIG. 1, two tensioning rods 24 are seen. The placement of tension rods 224 in FIG. 1 is actually premature, but is done so for expository purposes. Tensioning rods 24 are not put into position until enclosure structure 10 has been placed on vehicle 15 as seen in FIG. 3. Once enclosure structure 10 is so positioned, tensioning rods 24 are placed between tailgate 17 and window lift gate 16. Rods 24 tend to urge lift gate 16 and tailgate 17 away from each other. When this occurs with enclosure structure 10 in position covering over lift gate 16 and under tailgate 17, the side walls 14 of enclosure structure 10 are placed in tension. This tensioning of the side walls further adds to the stability of the enclosure when it is on the vehicle and permits the vehicle to travel on roads at speeds in excess of forty miles per hour.

Enclosure structure 10 is provided with additional convenience features. For example, top panel 12 has a flexible, transparent window 18. When enclosure structure 10 is positioned as in FIG. 3, window 18 is in juxtaposition with window 19 on lift gate 16. Thus, light is allowed into the enclosure when it is in place on vehicle 15.

On face panel 11, three zippers 27, shown by dash lines, are provided to provide an entry and egress port at the rear of vehicle 15 when enclosure structure 10 is in position. The zipper pulls all come into a common position 28 when the zippers 27 are closed. Thus, zippers 27 may be locked by placing a padlock through their pulls at position 28.

Face panel 11 is also provided with a pair of flexible windows 25 so that vision and light to and from the rear of the vehicle is permitted.

As shown in FIG. 3, when one of the egress and entry panels 29 are opened, a screen window 30 is disclosed. Screen window 30 may be opened from the inside of the vehicle so that occupants of the vehicle may have means of entry and egress to and from vehicle 15.

If a person is sleeping within vehicle 15 with his or her head toward the rear of the vehicle, a vantage point is provided by small windows 26. Windows 26 will be adjacent the head of a person sleeping in vehicle 15 with her head adjacent the rear of the vehicle.

Further convenience may be provided by utilizing a tent 40 which is equipped with coupling flaps 41 which act as weather shields and couple tent 40 to the enclosure structure 10 when vehicle 15 is backed up in close proximity to tent 40 so that coupling flaps 41 may be extended outward and over enclosure structure 10. Flap 42 will lie atop top panel 12 of enclosure structure 10. A pair of side flaps 43 will lie adjacent side panels 14 of enclosure structure 10. Hook and loop fasteners may be utilized to maintain flaps 41 in position; or elasticized load fastening straps may be used for that purpose as well.

What has been described is a flexible enclosure structure which may be placed on a vehicle so that its bottom and two sides are anchored within the vehicle's interior. The top panel is fastened to the roof, preferably in a manner which results in a low air flow impedance. With the internal anchoring and the low air flow impedance to the structure along the outer surfaces of the vehicle, the vehicle may be driven on roadways for short errands while the structure is in place. When desired, the enclosure structure may be removed from the vehicle and folded, because of its flexibility, into a small, conveniently carried package. The structure includes windows to permit the entry of light and entry and exit flaps which may be closed during inclement weather. When the flaps are open, screening inhibits the entry of insects. When camping of more than a transient moment is anticipated, a tent enclosure may be coupled to the vehicle mounted enclosure.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention.

That which is claimed is:

1. A portable enclosure comprising in combination a face panel peripherally bordered by a top panel, a bottom panel, and a pair of side panels, the combination forming a foldable, open, box-like structure;
- an automotive vehicle having a rear, a roof, a lift window gate and a drop tailgate;
- a plurality of protuberances within the interior of said vehicle to which load securing straps may be removably affixed;
- a plurality of load securing straps coupling said pair of side panels and said bottom panel to said plurality of protuberances so as to draw said side panels inwardly toward the forward interior of said vehicle and said bottom panel forwardly and upwardly against said drop tailgate; and
- means for securing said top panel to said roof so as to draw said top panel forwardly and downwardly atop said lift window gate, the drawn panels of the structure cooperating to allow the high speed movement of the vehicle when the structure is coupled thereto, the drawn panels further inhibiting entry of persons and inclement weather into said box-like structure.

2. The enclosure of claim 1 wherein said lift window gate and said drop tailgate further comprise means for placing said pair of side panels of said box-like structure in tension.

3. The enclosure of claim 2 wherein said means for placing said side panels in tension comprise means for urging and maintaining said lift window gate and said drop tailgate apart to thereby apply an upward directed force to said top panel of said box-like structure and a downward directed force to said bottom panel, said opposing forces placing said side panels in tension.

4. The enclosure of claim 3 wherein said means for urging and maintaining said window lift gate and said drop tailgate apart comprise a wedge pole coupled between said lift gate and said tailgate urging said gates apart.

5. The enclosure of claim 1 wherein said top panel of said box-like structure includes a flexible window, said flexible window being juxtaposed with the window of said vehicle's lift window gate.

6. The enclosure of claim 1 wherein said face panel of said box-like structure includes a first entry and egress port for permitting entry to and exit from said vehicle through said port, said port further including closure means for inhibiting entry of persons and inclement weather through said port.

7. The enclosure of claim 6 further comprising a ground based antichamber removably coupled to said top and side panels of said box-like structure;
- said antichamber being a tent having a second entry and egress port juxtaposed to said first entry and egress port in said face panel of said box-like structure when said antichamber is coupled to said top and side panels of said structure, said juxtaposition of said first and said second entry and egress ports permitting a person egress from said vehicle and entry into said antichamber.

8. The enclosure of claim 1 wherein said face panel includes a flexible window therein.

9. The enclosure of claim 8 wherein said face panel of said box-like structure includes a first entry and egress port for permitting entry to and exit from said vehicle through said port, said port further including closure means for inhibiting entry of persons and inclement weather through said port.

10. The enclosure of claim 9 wherein said port is screened to inhibit entry of insects into said enclosure.

11. The enclosure of claim 10 wherein said port further includes closure means for inhibiting entry of persons and inclement weather through said port.

12. The enclosure of claim 1 wherein the means for securing said top panel to said roof comprises a magnetic strip mounted on said top panel for securing said top panel to said roof.

13. The enclosure of claim 1 wherein said vehicle further includes a rooftop carrier and further wherein the means for securing said top panel to said roof comprises loading straps coupling said top panel to said rooftop carrier.

14. A portable enclosure comprising in combination a face panel peripherally bordered by a top panel, a bottom panel, and a pair of side panels, the combination forming a foldable, open, box-like structure;
- an automotive vehicle having a rear, a roof, a lift window gate and a drop tailgate;
- a plurality of protuberances within the interior of said vehicle to which load securing straps may be removably affixed;
- a plurality of load securing straps coupling said pair of side panels and said bottom panel to said plurality of protuberances so as to draw said side panels inwardly toward the forward interior of said vehicle and said bottom panel forwardly and upwardly against said drop tailgate;
- means for securing said top panel to said roof so as to draw said top panel forwardly and downwardly atop said lift window gate, the drawn panels of the structure cooperating to allow the high speed movement of the vehicle when the structure is coupled thereto, the drawn panels further inhibiting entry of persons into the structure; and
- said face panel of said box-like structure including a first entry and egress port for permitting entry to and exit from said vehicle through said port, said port further including closure means for inhibiting entry of persons and inclement weather through said port.

15. A portable enclosure comprising in combination a face panel peripherally bordered by a top panel, a bottom panel, and a pair of side panels, the combination forming a foldable, open, box-like structure;
- an automotive vehicle having a rear, a roof, a lift window gate and a drop tailgate;
- a plurality of protuberances within the interior of said vehicle to which load securing straps may be removably affixed;
- a plurality of load securing straps coupling said pair of side panels and said bottom panel to said plurality of protuberances so as to draw said side panels inwardly toward the forward interior of said vehicle and said bottom panel forwardly and upwardly against said drop tailgate;
- means for securing said top panel to said roof so as to draw said top panel forwardly and downwardly atop said lift window gate, the drawn panels of the structure cooperating to allow the high speed movement of the vehicle when the structure is coupled thereto, the drawn panels further inhibiting entry of persons into said structure; and
- means for urging and maintaining said lift window gate and said drop tailgate apart to thereby apply an upward directed force to said top panel of said box-like structure and a downward directed force to said bottom panel, said opposing forces placing said side panels in tension.

16. The enclosure of claim 15 further wherein said face panel of said box-like structure includes a first entry and egress port for permitting entry to and exit from said vehicle through said port, said port further including closure means for inhibiting entry of persons and inclement weather through said port.

* * * * *